UNITED STATES PATENT OFFICE.

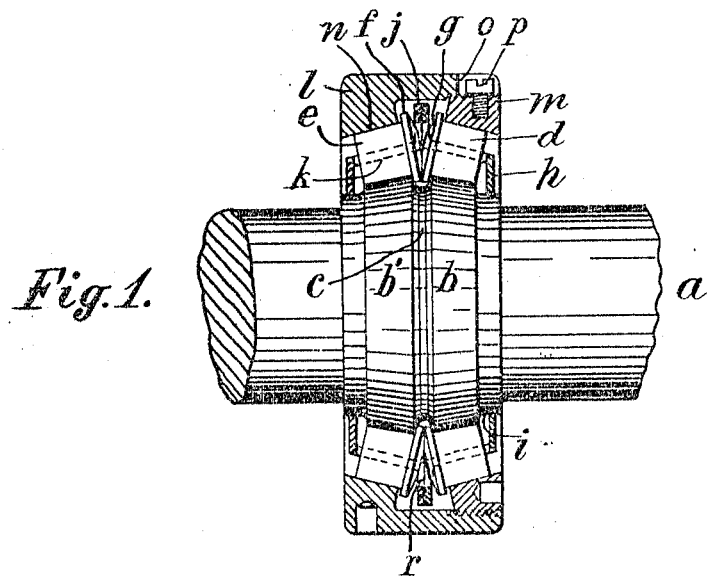
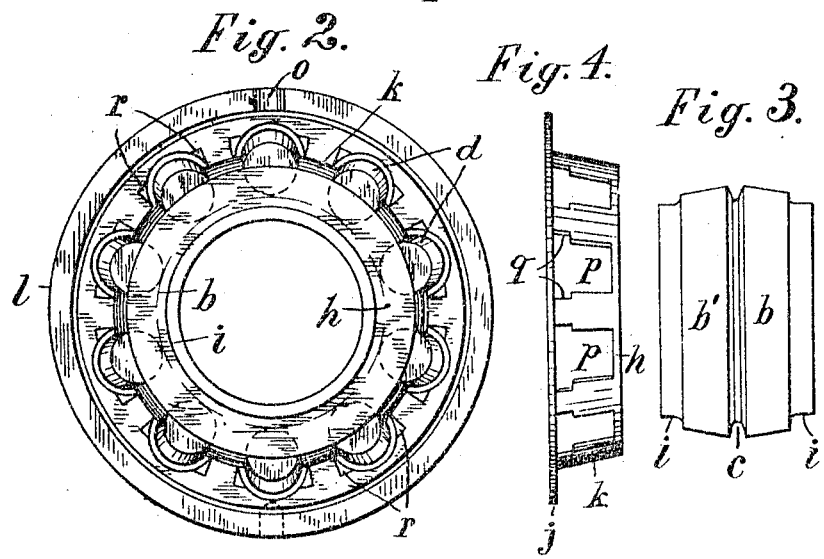
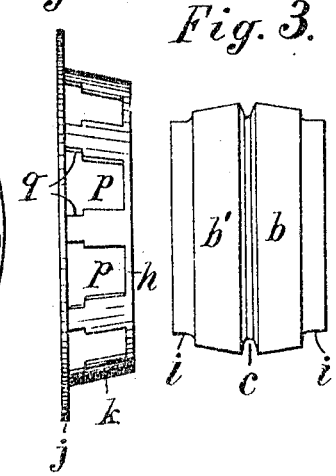

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH COMBINED THRUST AND BEARING ROLLS.

955,888.   Specification of Letters Patent.   Patented Apr. 26, 1910.

Application filed March 26, 1909, Serial No. 485,972. Renewed March 12, 1910. Serial No. 549,009.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings with Combined Thrust and Bearing Rolls, fully described and represented in the following specification and the accompanying drawings, forming a part of the same.

This invention relates to a special form of roller bearings in which a hub is provided to secure upon the axle and formed with conical seats having their bases adjoining and two sets of tapering rolls fitted to revolve upon such seat.

The present improvement consists in forming the center of the hub with an annular groove and providing the contiguous ends of the two sets of rolls with flanges adapted to run in such groove, and thus enabled to resist end-thrust positively in either direction.

The invention will be understood by reference to the annexed drawing, in which Figure 1 is a view showing a longitudinal section of the casing and cage; Fig. 2 is an end view of the bearing with the nearer ring of the casing removed; and Fig. 3 is a side elevation of the hub. Fig. 4 is a view illustrating an edge view of one of the sections.

$a$ designates the axle upon which the hub is secured by any suitable means and provided with two conical seats $b$, $b'$, having their bases adjoining and separated by a groove $c$. Two sets of tapering rolls $d$ and $e$ are shown fitted to revolve upon the seats $b$, $b'$, with their larger ends in contact with one another. These larger ends are formed with flanges $f$ which project into the groove $c$ and with contiguous conical surfaces $g$ which roll in contact with one another and serve to hold the flanges $f$ in contact with the opposite edges of the groove $c$, thus resisting any end movement of the rolls. The rolls and the seats $b$, $b'$, are tapered in the same proportion, so that the rolls revolve on the conical seats without sliding friction, and the conical surfaces $g$ operate in a similar manner. A cage is shown to hold the rolls in place upon the seats $b$, $b'$, such cage having flanges $h$ which fit upon cylindrical seats $i$ at the opposite ends of the hub, flanges $j$ which are fitted and joined together between the adjacent ends of the rolls $d$, $e$, and radial bars $k$ between which the rolls are fitted and revolve, as shown in Fig. 2. The casing is formed with a body $l$ and an adjusting ring $m$ screwed into the body, each having a tapering seat $n$ therein to embrace the outer sides of the rolls $d$, $e$. A notch $o$ is shown in the edge of the body $l$ to receive the head $p$ of a screw, which is inserted in the periphery of the ring $m$ when the parts are properly adjusted, thus holding the parts $l$ and $m$ in their adjusted relation. Such parts are shown in my application No. 485,969 filed March 26, 1909 for patent on self-contained roller bearing, but the present invention differs from that in providing a means in the groove $c$, and the flanges $f$ upon the rolls, to positively prevent any end movement of the rolls. As the tapering seats in the casing engage the inclined surfaces of the rolls, the casing is thus held positively from end movement, and the bearing operates effectively to resist end-thrust as well as lateral strains An end view of one-half of the cage is shown in Fig. 4, and to adapt such a cage to flanged rolls the cage is formed with apertures $p$ between the bars $k$, and the end of such aperture nearest the flange $j$ is formed with notches $q$ at its opposite edges which form clearance for the edges of the roll-flanges $f$. In addition to the notches $q$ the flanges $j$ of the cage are provided as shown in Fig. 2 with notches $r$ extending outwardly from the edges of the notches $q$ and of sufficient height to clear the conical ends $g$ of the rolls, as shown in Fig. 1, so that these conical ends may contact with one another inside of the notches $q$ and $r$.

A divided cage with simple apertures for the rolls is shown in my application No. 485,969 filed March 26, 1909, for patent on self-contained roller bearing, and my claims herein are therefore limited to a cage having provision for clearance for the roll-flanges $f$, while fitted to the opposite sides of the rolls to guide them in their movement around the hub.

Having thus set forth the nature of the invention what is claimed herein is:

1. In a roller bearing, the combination, with a hub having a groove at the middle of its length with roll-seats at opposite sides of the groove, of two sets of rolls fitted to the roll-seats with their ends in contact over the groove and flanges upon the contiguous ends of the rolls fitted to revolve in the said groove.

2. In a roller bearing, the combination, with a hub having opposed conical seats with their bases adjoining and a groove formed between such bases, of two sets of rolls fitted to revolve upon the seats and having flanges fitted into the said groove, the contiguous ends of the rolls having conical surfaces to roll in contact with one another, and a casing having tapering seats fitted to the outer sides of the rolls.

3. In a roller bearing, the combination, with a hub having opposed conical seats with their bases adjoining and a groove formed between such bases, of two sets of tapering rolls fitted to revolve upon the seats and having flanges upon their larger ends fitted into the said groove, the flanged ends of the rolls having conical surfaces to roll in contact with one another, and a divided casing having tapering seats fitted to the outer sides of the rolls and adjustable to bear snugly upon said rolls.

4. In a roller bearing, the combination, with a hub having opposed conical seats with their bases adjoining and a groove formed between such bases, of two sets of rolls fitted to revolve upon the seats and having flanges fitted into the said groove, the contiguous ends of the rolls having conical surfaces to roll in contact with one another, a cage with openings to receive and guide the rolls about the hub, and a divided casing having tapering seats fitted to the outer sides of the rolls.

5. In a roller bearing, the combination, with a hub having opposed conical seats $b, b'$, with groove $c$ at the middle, of two sets of rolls rotated with their contiguous ends in contact and flanges upon such contiguous ends fitted to such groove, and a cage fitted to rotate upon the hub and having the apertures $p$ fitted to the bodies of the rolls to guide the same in their movement and the notches $q$ arranged to clear the flanges of the rolls.

6. In a roller bearing, the combination, with a hub having opposed conical seats $b, b'$, with groove $c$ at the middle, of two sets of rolls rotated with their contiguous ends in contact and flanges upon such contiguous ends fitted to such groove and a cage fitted to rotate upon the hub and having the inner flange $h$ and outer flange $j$ joined by the inclined guide-bars $k$ with apertures $p$ between the guide-bars fitted to the sides of the rolls to guide the same, notches $q$ at one end of such apertures with adjacent notches $r$ in the flange $j$ to clear the flanges $f$ of the rolls.

In testimony whereof I have hereunto set my hand in the presence of two subscribing witnesses.

CHARLES S. LOCKWOOD.

Witnesses:
  A. GUSEVANT,
  H. E. SAUL.